Jan. 13, 1970

L. J. LORENZ ET AL 3,489,234

SNOWMOBILE SUSPENSION

Filed July 15, 1968

INVENTORS.
LEO J. LORENZ
BY JACK H. ROSE
Tweedale & Gerhardt
ATTORNEYS.

Jan. 13, 1970  L. J. LORENZ ET AL  3,489,234
SNOWMOBILE SUSPENSION
Filed July 15, 1968  2 Sheets-Sheet 2

INVENTORS.
LEO J. LORENZ
JACK H. ROSE
BY
Tweedale & Gerhardt
ATTORNEYS.

An image failed to render here — but based on standard patent format:

United States Patent Office 3,489,234
Patented Jan. 13, 1970

3,489,234
SNOWMOBILE SUSPENSION
Leo J. Lorenz, Farmington, and Jack H. Rose, Livonia,
Mich., assignors to Massey-Ferguson Inc., Des Moines,
Iowa, a corporation of Maryland
Filed July 15, 1968, Ser. No. 744,723
Int. Cl. B62m 27/00; B62d 55/14
U.S. Cl. 180—5                                                4 Claims

ABSTRACT OF THE DISCLOSURE

A snowmobile has a body which mounts a pair of steerable skis and an endless driven track for propulsion. The rear portion of the body is supported on the track by a plurality of spring-suspended bogey wheels and by rear idler sprocket wheels. The sprocket wheels are rotatably supported on a shaft that is pivoted to a pair of forwardly extending lever arms. The lever arms are pivoted to body mounted stud shafts that extend inwardly of the sides of the snowmobile between the track runs. Torsion springs encircle the stub shafts and engage the lever arms to bias the sprocket wheels downwardly. This arrangement provides a protective location for the torsion springs to preclude damage to them.

---

This invention relates generally to endless track vehicles an dmore particularly to a suspension for a small personal endless track vehicle known generally as a snowmobile.

Snowmobiles are conventionally propelled over all types of terrain or ground, such as ice, snow, or frozen turf, by a driven endless track. The snowmobile is supported on the track by a plurality of bogey wheels or runners, and a plurality of rear idler sprocket wheels which are adjustable to vary track tension. These sprocket wheels are generally supported on the ends of lever arms that extend rearwardly to pivotal engagement with the snowmobile body and are biased downwardly by rear mounted stiff springs.

This conventional spring mounting arrangement exposes the springs to damage from rocks, tree stumps, or other obstacles. It also requires excessive rear body overhang which decreases maneuverability.

It is therefore an object of this invention to provide an improved suspension for a snowmobile wherein the rear idler sprocket wheel suspension is protected from external damage. Another object is to provide a suspension which reduces the amount of rear body overhang of the track. A further object is to provide a suspension which utilizes the track as part of the suspension.

This invention provides an improved snowmobile suspension wherein the suspension springs for the rear idler sprocket wheels are mounted in a protected location forwardly of the wheels and inwardly between the track runs.

Other objects and features of the invention will become more readily apparent upon reference to the following detailed description of a preferred embodiment of this invention shown in the accompanying drawings, in which.

Figure 1:
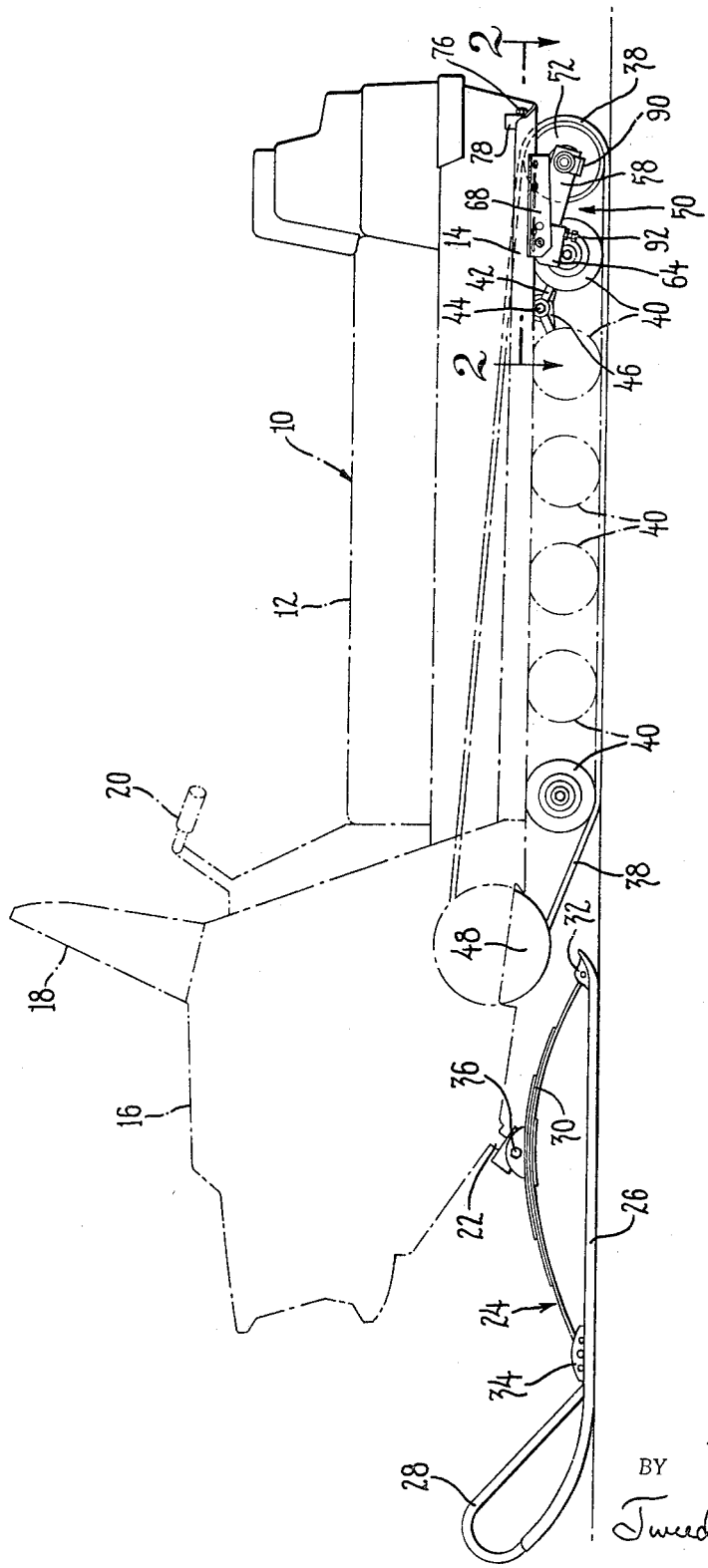
FIG. 1 is a side elevation of a snowmobile, partly in phantom lines, embodying an improved suspension according to this invention.

Referring now to FIG. 1 of the drawings, a snowmobile includes a body 10 that is provided with a passenger seat 12, a foot rest 14 and a front cowl 16 which supports a windshield 18. The body 10 also mounts a steering operator or handlebars 20 which operate a conventional steering linkage to pivot a pair of spaced steering shafts 22 and their associated ski assemblies 24. Since the ski assemblies 24 are identical, only one of them is shown and will be described.

The ski assembly 24 includes a substantially flat ground engaging ski 26 which is curved at its forward end and terminates in a conventional handle 28. A leaf spring unit 30 is pivotally attached to a bracket 32 at the rear edge of ski 26. The forward end of spring unit 30 is attached to a ski mounted bracket 34, as more fully described in copending application entitled, "Adjustable Snowmobile Suspension."

The spring unit 30 is pivoted at 36 to a flange of steering shaft 22 to permit variable ski pitch angles. The spring unit 30 thus supports the weight of the front portion of body 10. Thus, manipulation of handlebars 20 will pivot the ski assemblies to steer the snowmobile body 10.

The snowmobile body 10 is propelled along the ground by an endless flexible track 38, the lower run of which supports a plurality of bogey wheels 40. Pairs of the bogey wheels 40 (only the left side wheel of each pair is shown) are mounted on lever arms 42 that are pivoted to body mounted shafts 44. A torsion spring 46 biases pairs of adjacent bogey wheels 40 downwardly to thus support the weight of the snowmobile body 10 on the track lower run.

The track 38 is conventionally driven by a sprocket wheel (not shown) located behind a shield 48. The sprocket wheel is driven by a power source (not shown) mounted within the front cowl 16.

Figure 2:
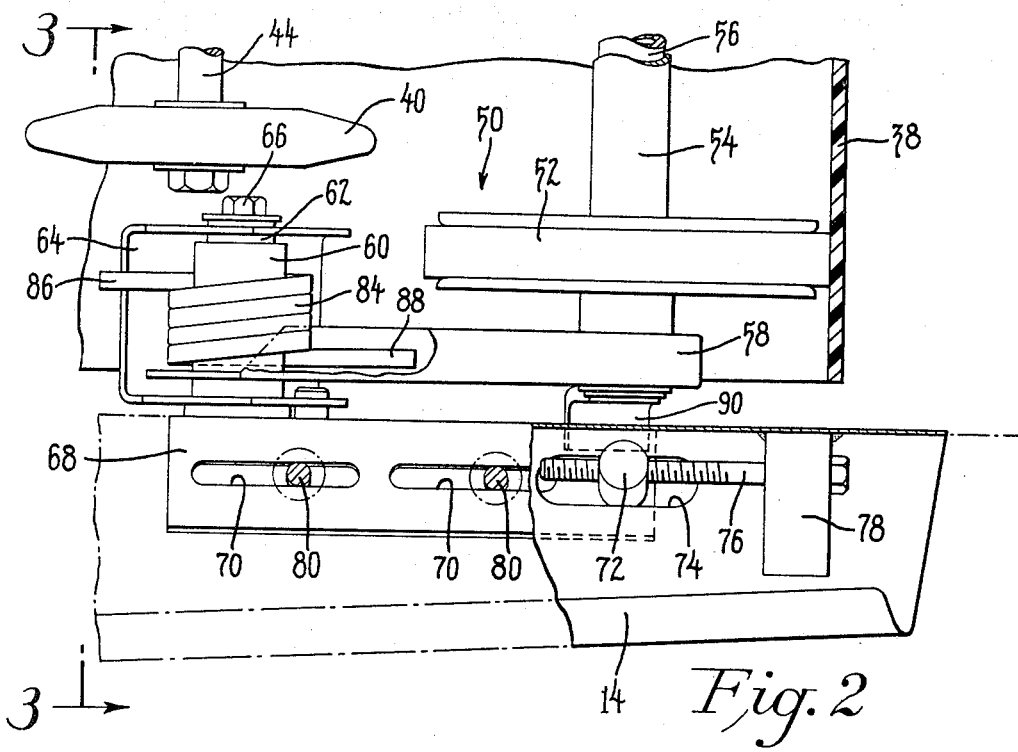
FIG. 2 is an enlarged sectional view taken generally along lines 2—2 of FIG. 1, showing in greater detail the improved suspension according to this invention.
Figure 3:
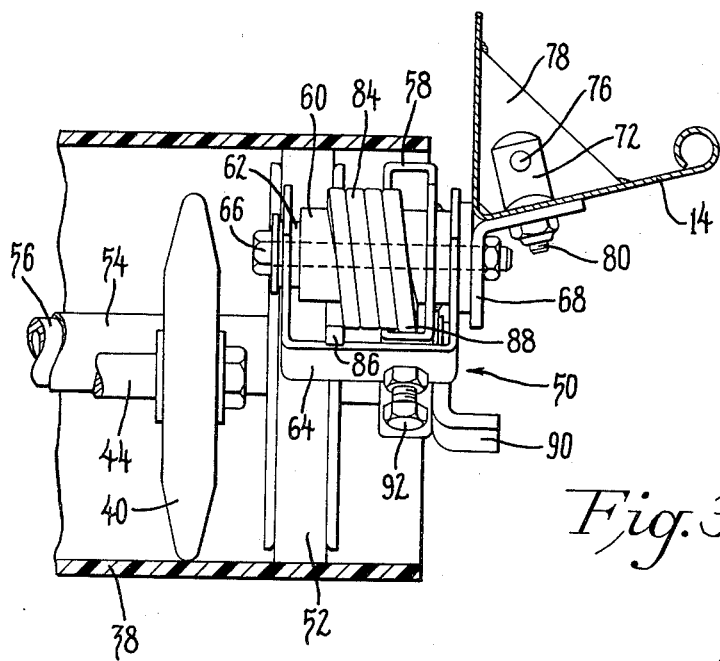
FIG. 3 is a sectional view taken generally along lines 3—3 of FIG. 2.

Track tension is maintained by a suspended rear idler sprocket wheel assembly 50, shown in better detail in FIGS. 2 and 3. Since both ends of the assembly 50 are identical, only the left side is shown and will be described. The assembly 50 includes rear end or sprocket wheels 52 which are mounted on a sleeve 54 rotatably supported on a shaft 56. At its extremity, shaft 56 mounts a lever arm 58 having a channel-shaped cross section, as best seen in FIG. 3.

Lever arm 58 extends forwardly of the body 10 and rigidly mounts a collar 60 which is rotatably supported on a stub shaft 62 extending inwardly between the track runs. Shaft 62 non-rotatably mounts a U-shaped bracket 64 and both are rigidly secured by a bolt 66 to a flanged bracket 68.

Bracket 68 includes a pair of elongated slots 70 and mounts a threaded post 72. Post 72 extends through an elongated slot 74 in foot rest 14 and is engaged by an adjustment bolt 76 mounted on a triangular body bracket 78. Rotation of bolt 76 in either direction moves bracket 68 and sprocket wheels 52 longitudinally of the snowmobile body 10 to adjust the tension of track 38. This adjustment is maintained by bolts 80 which extend thorugh slots 70 and clamp bracket 68 to the foot rest 14.

A stiff torsion spring 84 is carried by collar 60 and has one arm 86 engaging the U-shaped bracket 64. The o'her arm 88 of the torsion-spring 84 engages the lower side of lever arm 58 to bias the lever arm and thus sprocket wheels 52 downwardly, away from the body. This arrangement permits vertical displacement of sprocket wheels 52 to accommodate rough ground.

Upward displacement of sprocket wheels 52 against the force of spring 84 is limited by abutment of a flanged bracket 90, mounted on the end of shaft 56, with the bracket 68. Downward displacement of sprocket wheels 52 is limited by abutment of the lower edge of lever arm 58 with an adjustment bolt 92 mounted on the bottom of bracket 64. This arrangement is more fully described in the aforementioned copending application.

The construction described above enables location of the rear idler sprocket wheel lever arms 58, the pivotal body mounts 60, 62, 64 and the suspension springs 84 inboard of the outer edge of the foot rest 14, inwardly of the outer edge of the track 38 and between the upper and lower track runs. This location effectively protects the suspension from damage caused by striking external objects such as rocks, ice, and rough frozen ground, a problem common to conventional snowmobile suspensions.

Another advantage of the suspension construction according to this invention is that the amount of body overhanging the track at the rear is substantially reduced over conventional constructions. Since no rear suspension mounts are needed, the body may be shortened to produce a more maneuverable snowmobile for any given track size.

A further advantage of the suspension construction according to this invention is the use of the track as part of the suspension. It is readily apparent that as the arm 58 swings upwardly about shaft 62, the rear idler sprocket wheels 52 tension the track 38. This results from the length of arm 58 and the location of shaft 62 relative to the track runs. Since it has some longitudinal elasticity, the track itself contributes to the suspension of the snow mobile.

While only a preferred embodiment of the subject invention has been shown and described, modifications thereof are contemplated within the scope of the appended claims.

What is claimed is:

1. In combination with a snowmobile having a body, an endless track arranged for movement along upper and lower runs, a plurality of bogey wheels mounted on the body and engaging the lower track run with the terrain to support the rear portion of the body on the terrain, power means mounted on the body for driving the track to propel the body along the terrain, steerable skis for supporting the front portion of the body on the terrain, control means mounted on the body for operating the skis to steer the body, and a plurality of rear idler wheels engaging and tensioning the track, suspension means for the rear idler wheels including: a shaft extending laterally of the body and rotatably mounting the rear idler wheels, a pair of arms extending longitudinally of the body, means securing the rear ends of the arms to the ends of the shaft, a pair of stub shafts located forwardly of the rear idler wheels at either side of the body and extending inwardly of the outer edge of the track between the track runs, means pivotally supporting the forward ends of the arms on the stub shafts to enable vertical displacement of the rear idler wheels relative to the body, adjustable means mounting the stub shafts on the body for selective location longitudinally of the body to variably position the rear idler wheels and vary track tension, and spring means mounted on the body at either side thereof inwardly of the outer edge of the track between the track runs and biasing the arms and rear idler wheels toward the terrain away from the body, the track thereby forming a protective housing for the suspension means.

2. In combination with a snowmobile having a body, endless ground engaging track means for propelling the body along the terrain, means mounting the track means on the body for movement along upper and lower runs including a rear end wheel, support means for supporting a portion of the body on the lower run, means mounted on the body for driving the track means, steerable means for supporting another portion of the body on the terrain, and control means mounted on the body for operating the steerable means to steer the body, suspension means for the rear end wheel including: an arm pivoted at one end to the rear end wheel, a shaft extending inwardly of the outer edge of the track means and between the runs thereof, means mounting the shaft on the body, a collar mounted on the said other end of the arm and rotatably supported on the shaft to permit vertical displacement of the rear end wheel relative to the body, a torsion spring encircling the collar between the runs of the track means, means securing one end of the spring to the body, means securing the other end of the spring to the arm to bias the arm away from the body and means mounting the spring means on the body inwardly of the outer edge of the track means between the runs thereof, the track means providing a protective enclosure for the spring means.

3. The combination of claim 2, wherein the means mounting the shaft on the body include: a mounting member secured to the outer end of the shaft, and cooperating adjustment means on the body and on the mounting member for locating the mounting member longitudinally of the body, thereby locating the rear end wheel longitudinally of the body to vary track tension.

4. The combination of claim 2, including cooperating means on the body and on the arm for limiting pivotal movement of the arm to limit displacement of the rear end wheel relative to the body.

References Cited

UNITED STATES PATENTS

| | | | |
|---|---|---|---|
| 2,041,599 | 5/1936 | Fergusson | 180—9.54 |
| 2,453,750 | 11/1948 | Kamlookine | 305—31 |
| 3,023,824 | 3/1962 | Bombardier | 305—27 X |

OTHER REFERENCES

Popular Mechanics, pp. 138–139, October 1967.

RICHARD J. JOHNSON, Primary Examiner

U.S. Cl. X.R.

305—32